Patented Aug. 22, 1950

2,519,791

UNITED STATES PATENT OFFICE 2,519,791

CATALYZED ETHYLENE POLYMERIZATIONS

Milton J. Roedel, Wilmington, Del., assignor to E. I. du Pont de Nemours & Company, Wilmington, Del., a corporation of Delaware No Drawing. Application July 18, 1945, Serial No. 605,837

1 Claim. (Cl. 260—94.9)

This invention relates to improvements in the catalytic polymerization of ethylene.

It is known that ethylene can be polymerized with the aid of catalysts such as dialkyl dioxides, acyl peroxides, oxygen, Chloramine T, manganese dioxide, amine oxides, tetraphenyl tin, tetraphenyl lead, tetraethyl lead, diethyllead dibromide, butyl lithium, sodium perborate, sodium persulfate, potassium chlorate plus manganese dioxide, and hydrazine compounds. All of these catalysts, however, with the exception of the dialkyl dioxides have many short-comings. For instance, some catalysts contaminate the ethylene polymer with inorganic residues, which impair its excellent electrical properties and heat stability, and others give ethylene polymers of limited solubility and melt extrudability. In addition, many catalysts produce ethylene polymers containing appreciable quantities of infusible, insoluble, particles which cannot be removed readily by filtration. For convenience of expression, these particles are designated by the term "grain." Of the catalytic materials mentioned above, the dialkyl dioxides are particularly useful since they do not contaminate the ethylene polymer with an inorganic residue, and do, under selected polymerization conditions catalyze the formation of soluble and readily extrudable ethylene polymers. The lower dialkyl dioxides, such as diethyl dioxide, however, are difficult to synthesize, are expensive, and are relatively unstable to shock.

It is accordingly an object of this invention to provide a new and improved method for polymerizing ethylene alone and in admixture with other polymerizable compounds. Another object is to provide a new catalyst for the polymerization of ethylene alone and in admixture with other organic compounds to obtain polymers having exceptionally high tensile strength and stiffness values. Other objects will appear as the description proceeds.

These and other objects are attained in accordance with this invention by polymerizing ethylene in the presence of di(tertiary butyl) peroxide as a catalyst. The polymerization of ethylene employing di(tertiary butyl) peroxide as the catalyst can be carried out as a batch, semi-continuous, or continuous operation.

In operating the process batch-wise, a suitable reaction vessel is charged with a reaction medium, which may consist wholly of water, an organic liquid, or a mixture of organic liquid and water, and the di(tertiary butyl) peroxide. The vessel is swept with oxygen-free nitrogen, closed, cooled, evacuated to constant pressure, placed in a heated shaker machine, and connected to a source of ethylene, and recording thermocouples are inserted into the vessel. The reaction vessel is charged with ethylene to the desired pressure and heating and agitation are started. Upon reaching reaction temperature the reaction starts and is normally followed by a pressure decrease due to utilization of the ethylene. Pressure within the system is maintained throughout the reaction period either by the addition of fresh ethylene or by decreasing the free space in the reactor by increasing the volume of the reaction medium. When reaction is complete, as evidenced by cessation of pressure drop, the vessel is cooled, bled of excess ethylene, and opened and the reaction mixture is discharged. The polymer is isolated from the reaction mixture by means well known to the art, e. g., by filtering and drying. The polymer is usually in a satisfactory form but it may be purified by washing on a mill, by solvent extraction, by steam distillation, drying, etc.

A modification of the above process includes polymerizing the ethylene with another polymerizable organic compound. The organic compound to be polymerized with the ethylene can be added with the catalyst, or, if it is a gas at normal temperatures and pressures it may be expanded from pressure storage tanks into the closed reaction vessel prior to or after pressuring with ethylene, or it may be added in admixture with the ethylene.

The proportion of polymerizable organic compound charged into the reaction vessel can be varied over a wide range. Control of this variable can be had either by varying the pressure in the reaction vessel, by varying the ratio of liquid charge to the free space in the reactor, by varying the reaction temperature, or by a combination of these.

As a rule the amounts of di(tertiary butyl) peroxide will vary from about 0.0005% to about 5% of the total weight of monomers charged into the reaction vessel.

The polymerization of the ethylene along or in admixture with another polymerizable organic compound is conducted in vessels which are either constructed of or lined with stainless steel, silver, aluminum, mild steel, etc.

The examples which follow are submitted to illustrate and not to limit the invention. Unless otherwise stated parts are by weight.

*Example 1.*—A stainless steel-lined pressure reactor is charged with 100 parts of deoxygenated water and 0.2 part of di(tertiary butyl) peroxide, flushed with nitrogen, closed, cooled, evacuated, and pressured to 200 atm. with ethylene containing less than 10 P. P. M. of oxygen. The reaction mixture is heated to 120° C. and kept at 117° to 123° C. for 18 hours, while the pressure is held at 850 to 950 atm. by occasional repressuring with ethylene. The reactor is cooled, bled of excess gas, and opened. The polyethylene obtained is washed with acetone and dried at 100° C. under vacuum. The yield of polymer is 50 parts. A film of the polymer pressed at 140° C. between smooth surfaces has a tensile strength of 3600 lb./sq. in. and an elongation at break of 475%. The polymer is soluble in xylene at 100° C. to the extent of at least 20%, is relatively free of grainy particles, and has an intrinsic viscosity of 1.30, as determined at 85° C. in xylene at a concentration of 0.125 g. per 100 ml. of solution.

Duplication of the above example using diethyl peroxide as the catalyst instead of di(tertiary butyl) peroxide leads to the formation of polymer having a tensile strength of 2,600 lb./sq. in. and an elongation at break of 435%. The polymer is very grainy and is not soluble in xylene at 100° C. to the extent of 10%. Its intrinsic viscosity is 1.24, as determined at 85° C. in xylene at a concentration of 0.125 g. per 100 ml. of solution.

In order to obtain a high tensile strength, readily soluble polyethylene using diethyl peroxide as catalyst it is necessary to use anhydrous benzene as the polymerization medium as shown in the copending application S. N. 524,930, filed March 3, 1944. However, the use of anhydrous benzene as a polymerization medium leads to difficulties in heat transfer which in practice means that a lower space time yield of polyethylene is obtained than would be if water with its excellent heat transfer properties could be used. By using di(tertiary butyl) peroxide as the catalyst in place of diethyl peroxide the polymerization can be carried out in the presence of water without sacrifice in either the yield or quality of polymer.

*Example 2.*—A silver-lined pressure reactor is charged with 100 parts of freshly distilled vinyl acetate and 0.015 part of di(tertiary butyl) peroxide, flushed with nitrogen, closed, evacuated, and pressured to 550 atm. with ethylene containing less than 10 P. P. M. of oxygen. The vinyl acetate charged occupies about 25% of the free space of the reactor. The reaction mixture is heated to 130° C. and kept at 126° to 142° C. for 18 hours, while the pressure is held at 850 to 1000 atm. by occasional repressuring with ethylene. The reactor is cooled, bled of excess gas, and opened. Unreacted monomer is removed from the reaction mixture by distillation with steam. The ethylene/vinyl acetate polymer obtained is worked on a warm rubber mill to remove water. The yield of polymer is 115 parts. It contains ethylene and vinyl acetate in a mole ratio of 6.6/1 and has an intrinsic viscosity of 1.39, as determined at 25° C. in chloroform at a concentration of 0.1 g. per 100 ml. of solution.

In a polymerization carried out under the same conditions with diethyl peroxide instead of di(tertiary buty) peroxide as catalyst, the yield of ethylene/vinyl acetate polymer is only 33 parts.

*Example 3.*—A silver-lined reactor is charged with 100 parts of cyclohexane and 2 parts of di(tertiary butyl) peroxide. The charged reactor is flushed with nitrogen, closed, evacuated, and pressured to 250 atm. with a mixture of carbon monoxide and ethylene containing 44% carbon monoxide. The cyclohexane charge occupies about 25% of the free space in the reactor. The reaction mixture is heated to 135° C. and kept at 135° to 137° C. for 18 hours, while the pressure is held at 350 to 450 atm. by occasional repressuring with the ethylene/carbon monoxide gas mixture. The reactor is cooled, bled of excess gases, and opened. The ethylene/carbon monoxide polymer obtained is worked on a hot rubber mill to remove cyclohexane. The yield of polymer is 220 parts. The polymer contains 41.9% combined carbon monoxide, melts at 132° C., and has an intrinsic viscosity of 0.36 as determined at 25° C. in chloroform at a concentration of 0.1 g. per 100 ml. of solution. This polymer is useful in the preparation of plywood and adhesives and filled thermosetting moldings.

In a polymerization carried out under the same conditions with diethyl peroxide instead of di(tertiary butyl) peroxide the yield of polymer per gram of catalyst is only about half as great despite the fact that the peroxide-oxygen content of diethyl peroxide is nearly twice that of di(tertiary butyl) peroxide.

*Example 4.*—A silver-lined pressure reactor is charged with 100 parts of distilled water and 2 parts of di(tertiary butyl) peroxide, flushed with nitrogen, closed, evacuated, and pressured to 200 atm. with a mixture of carbon monoxide and ethylene containing 44% carbon monoxide. The water charge occupies about 25% of the free space in the reactor. The reaction mixture is heated to 135° C. and kept at 134° to 136° C. for 18.5 hours while the pressure is held at 340 to 450 atms. by occasional repressuring with the ethylene/carbon monoxide gas mixture. The yield of polymer, isolated by the procedure described in Example 3, is 107 parts. The polymer contains 42.2% combined carbon monoxide, melts at 138° C., and has an intrinsic viscosity of 0.3, as determined at 25° C. in chloroform at a concentration of 0.1 g. per 100 ml. of solution. The polymer is soluble in chloroform, methylene chloride, and hot dioxane.

In a polymerization carried out under the same conditions with diethyl peroxide instead of di(tertiary butyl) peroxide, only 10 parts of polymer is obtained. This polymer is insoluble in chloroform, methylene chloride, and hot dioxane.

The present invention provides a catalyst for the polymerization of ethylene alone and in admixture with other unsaturated polymerizable organic compounds which is effective over a wide range of temperatures and pressures, which is active in the presence of water and/or organic solvents, which is stable to shock, which leads to the formation of high molecular weight, tough, soluble polymers, and which is more economical on the basis of polymer yield per gram of catalyst than any dialkyl peroxide catalyst hitherto used.

Di(tertiary butyl) peroxide promotes the polymerization of ethylene alone and in admixture with other polymerizable organic compounds at temperatures in the range of about 60° to about 400° C. Its most effective range of operation is 100° to 250° C. This compound is active as a polymerization catalyst at atmospheric pressures. Generally, however, it is preferred to operate at pressures in excess of atmospheric because better yields of polymer and increased reaction rates are thereby obtained. As a rule pressures in the range of 2 to 3000 atmospheres and especially of from 10 to 1500 atmospheres are used. The upper pressure limit is determined by the mechanical restrictions of the equipment used. The particular conditions of temperature and pressure in any one case, however, are dependent upon the materials being polymerized. Temperatures and pressures are interdependent variables and the conditions for optimum results in any one instance have to be determined experimentally.

The di(tertiary butyl) peroxide of this invention can be used either in conjunction with a reaction medium or in the absence of such a medium.

It is preferred to use polymerizable monomers which are as pure as is commercially feasible.

In general, the process is operated under conditions such that the molecular oxygen content of the system is less than 1000 P. P. M., 200 P. P. M. being preferred, and less than 10 P. P. M. giving attractive products.

The catalysts of this invention are operable in the absence of agitation but in many instances good agitation is conducive to improved yields of polymer.

As previously indicated, di(tertiary butyl) peroxide is effective for the polymerization of ethylene alone and for its copolymerization with other polymerizable organic compounds. Examples of these are carbon monoxide, propylene, isobutylene, tetrafluoroethylene, vinyl fluoride, styrene, vinylidene fluoride, vinyl chloride, vinyl acetate, vinyl propionate, vinyl benzoate, vinyl trimethylacetate, vinyl hexenoate, butadiene-1,3, chloro-2-butadiene-1,3, fluoro-2-butadiene-1,3, acrylic and methacrylic esters, e. g. methyl acrylate, methyl methacrylate, octyl acrylate, decyl methacrylate, etc., acrylo- and methacrylonitriles, acrylamides, methacrylamides, etc., N-vinyl imides such as N-vinylphthalimide, N-vinylsuccinimide, etc., maleic and fumeric acids and their esters, e. g. dimethyl and diethyl maleate and fumarate, etc., maleic anhydride, etc.

I claim:

In a process for the homopolymerization of ethylene at a temperature between 60 and 400° C. and under a pressure between 2 and 3000 atmospheres, the step which comprises conducting the homopolymerization in the presence of 0.0005 to 5% of di(tertiary butyl) peroxide based on the total weight of monomer and in the presence of a reaction medium which consists wholly of water whereby a polymer is produced the film of which has a tensile strength of about 3600 pounds per square inch and an elongation at break of about 475%.

MILTON J. ROEDEL.

REFERENCES CITED

The following references are of record in the file of this patent:

UNITED STATES PATENTS

| Number | Name | Date |
| --- | --- | --- |
| 1,981,819 | Wiezevich et al. | Nov. 20, 1934 |
| 2,377,753 | Brubaker | June 5, 1945 |
| 2,391,920 | Peterson | Jan. 1, 1946 |
| 2,395,523 | Vaughan et al. | Feb. 26, 1946 |
| 2,403,771 | Vaughan et al. | July 9, 1946 |
| 2,414,769 | Rust et al. | Jan. 21, 1947 |
| 2,426,476 | Vaughan et al. | Aug. 26, 1947 |